United States Patent
Zhao et al.

(10) Patent No.: US 12,192,481 B2
(45) Date of Patent: *Jan. 7, 2025

(54) SIMPLIFIED MOST PROBABLE MODE LIST GENERATION SCHEME

(71) Applicant: TENCENT AMERICA LLC, Palo Alto, CA (US)

(72) Inventors: Liang Zhao, Sunnyvale, CA (US); Xin Zhao, San Diego, CA (US); Xiang Li, Los Gatos, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,287

(22) Filed: Nov. 29, 2022

(65) Prior Publication Data

US 2023/0093663 A1 Mar. 23, 2023

Related U.S. Application Data

(63) Continuation of application No. 17/239,114, filed on Apr. 23, 2021, now Pat. No. 11,570,445, which is a
(Continued)

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/11* (2014.11); *H04N 19/176* (2014.11)

(58) Field of Classification Search
CPC ..... H04N 19/159; H04N 19/105; H04N 19/11
See application file for complete search history.

(56) References Cited

U.S. PATENT DOCUMENTS

| 10,491,893 B1 | 11/2019 | Zhao et al. |
| 2007/0036226 A1 | 2/2007 | Kim et al. |

(Continued)

FOREIGN PATENT DOCUMENTS

WO WO-2020072346 A1 * 4/2020 ........... H04N 19/105

OTHER PUBLICATIONS

Kotra et al., "CE3 6.6.1: A simple 6-MPM list construction with truncated binary coding for non-MPM signalling", Joint Video Expert Team (JVET) of ITU-T SG 16 WP 3 and ISO/IEC JTC 1/SC 29/WG 11, Document: JVET-L0222-v2, Oct. 3-12, 2018, pp. 1-6 (6 pages total).

(Continued)

*Primary Examiner* — Michael Robert Cammarata
(74) *Attorney, Agent, or Firm* — ArentFox Schiff LLP

(57) ABSTRACT

A method of signaling an intra prediction mode used to encode a current block in an encoded video bitstream using at least one processor includes generating a first most probable mode (MPM) list corresponding to a zero reference line of the current block, wherein the first MPM list includes a plurality of angular intra prediction modes; generating a second MPM list corresponding to one or more non-zero reference lines of the current block, wherein the second MPM list includes the plurality of angular intra prediction modes; signaling a reference line index indicating a reference line used to encode the current block from among the zero reference line and the one or more non-zero reference lines; and signaling an intra mode index indicating the intra prediction mode within the first MPM list or the second MPM list.

18 Claims, 10 Drawing Sheets

Related U.S. Application Data continuation of application No. 16/694,266, filed on Nov. 25, 2019, now Pat. No. 11,032,551.

(60) Provisional application No. 62/786,031, filed on Dec. 28, 2018, provisional application No. 62/775,373, filed on Dec. 4, 2018.

(51) Int. Cl.
 *H04N 19/11* (2014.01)
 *H04N 19/176* (2014.01)

(56) References Cited

U.S. PATENT DOCUMENTS

| | | | |
|---|---|---|---|
| 2013/0114707 | A1 | 5/2013 | Seregin et al. |
| 2014/0064359 | A1 | 3/2014 | Rapaka et al. |
| 2014/0198179 | A1 | 7/2014 | Gu et al. |
| 2018/0098064 | A1 | 4/2018 | Seregin et al. |
| 2018/0146211 | A1 | 5/2018 | Zhang et al. |
| 2018/0332284 | A1 | 11/2018 | Liu et al. |
| 2020/0007879 | A1 | 1/2020 | Jiang et al. |
| 2020/0092544 | A1 | 3/2020 | Zhao et al. |
| 2020/0154100 | A1 | 5/2020 | Zhao et al. |
| 2020/0177914 | A1 | 6/2020 | Xu et al. |
| 2020/0204798 | A1 | 6/2020 | Li et al. |
| 2020/0244956 | A1 | 7/2020 | Lee et al. |
| 2021/0227213 | A1* | 7/2021 | Kim ............... H04N 19/176 |
| 2022/0038684 | A1 | 2/2022 | Urban et al. |

OTHER PUBLICATIONS

Albrecht et al., "Description of SDR, HDR, and 360 degree video coding technology proposal by Fraunhofer HHI", Joint Video Experts Team (JVET) of ITU-T SG 16 WP 3 and ISO/IEC JTC 1/SC 29/WG 11, JVET-J0014-v4, 10th Meeting: San Diego, US, Apr. 10-20, 2018 (17 pages total).

Bugdayci et al., "Intra prediction mode coding for scalable HEVC", 2013 IEEE International Conference on Acoustics, Speech and Signal Processing, May 31, 2013, pp. 1374-1378 <https://www.researchgate.net/profile/Done_Bugdayci/publication/261321144_Intra_prediction_mode_coding_for_scalable_HEVC/links/546f39b20cf24af340c07b0f.pdf> (6 pages total).

Communication dated Mar. 26, 2021, from the European Patent Office in European Application No. 19893435.8.

Extended European Search Report issued Mar. 26, 2021 in European Application No. 19893435.8.

Hui-Yu Jiang, "CE3-Related: Advanced MPM based on intra reference line selection scheme", Joint Video Experts Team (JVET) of ITU-T SG 16 WP 3 and ISO/IEC JTC 1/SC 29/WG 11, Document: JVET-K0175-v3, 11th Meeting, Ljubljana, SI, Jul. 10-18, 2018 (4 Pages Total).

Jiang et al., "CE3-related: Advanced MPM based on intra reference line selection scheme", Joint Video Experts Team (JVET) of ITU-T SG 16 WP 3 and ISO/IEC JTC 1/SC 29/WG 11, JVET-K0175-v3, 11th Meeting, Ljubljana, SI, Jul. 10-18, 2018 (4 pages total).

Li et al., "Efficient multiple line-based intra prediction for HEVC", In: IEEE Transactions on Circuits and Systems for Video Technology, Dec. 2, 2016,<https://arxiv.org/pdf/1605.08308.pdf> (11 pages total).

Office Action issued Jun. 7, 2022 in Japanese Application No. 2020-560447.

Zhao et al, "CE3-related: Modifications on MPM list generation", Joint Video Experts Team (JVET) of ITU-T SG 16 WP 3 and ISO/IEC JTC 1/SC 29/WG 11, Document: JVET-M0494_v3, 13th Meeting: Marrakech, MA, Jan. 9-18, 2019 (8 Pages Total).

Zhao et al, "CE3-related: MPM based multi-line intra prediction scheme", Joint Video Exploration Team (JVET) of ITU-T SG 16 WP 3 and ISO/IEC JTC 1/SC 29/WG 11, Document: JVET-K0482_r1, 11th Meeting: Ljubljana, SI, Jul. 10-18, 2018 (3 Pages Total).

ISR Written Opinion issued in PCT/US/2019/064408 dated Feb. 20, 2020.

ISR issued in PCT/US/2019/064408 dated Feb. 20, 2020.

Bross et al., "Versatile Video Coding (Draft 3)", 124. MPEG Meeting, Macao, Motion Picture Expert Group or ISO/IECJTC1/SC29/WG11), No. m45225, XP030215989, Dec. 3, 2018, 185 pages.

Bross et al.,"CE3: Multiple reference line intra prediction (Test 1.1.1, 1.1.2, 1.1.3 and 1.1.4)", 12. JVET Meeting, Macao, The Joint Video Exploration Team of ISO/IEC JTC1/SC29/WG11 and ITU-T SG.16) , No. JVET-L0283, XP030194473, Oct. 3, 2018.

Extended European Search Report and Search Opinion received for European Application No. 24169375.3, mailed on May 6, 2024, 11 pages.

Jiang et al., "On Derivation of Most Probable Modes for Intra Prediction in Video Coding," 2018 IEEE International Symposium on Circuits and Systems (ISCAS), May 27, 2018, pp. 1-4.

* cited by examiner

FIG. 8    Encoder 503

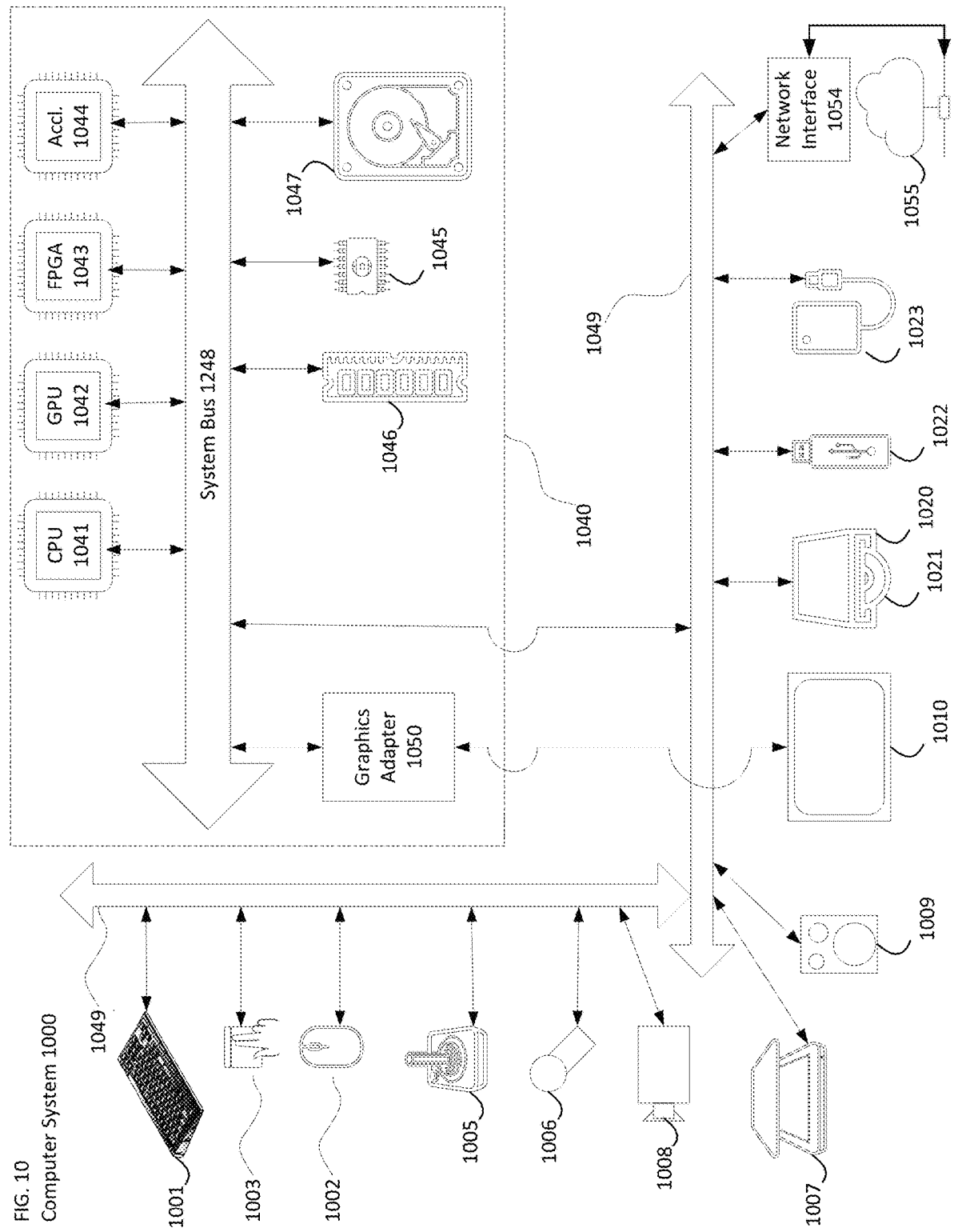

SIMPLIFIED MOST PROBABLE MODE LIST GENERATION SCHEME

CROSS-REFERENCE TO RELATED APPLICATION

This application is a continuation of U.S. patent application Ser. No. 17/239,114, filed on Apr. 23, 2021, which is a continuation of U.S. patent application Ser. No. 16/694,266, filed on Nov. 25, 2019, in the United States Patent & Trademark Office, which claims priority from 35 U.S.C. § 119 to U.S. Provisional Application No. 62/775,373, filed on Dec. 4, 2018, in the United States Patent & Trademark Office, and U.S. Provisional Application No. 62/786,031, filed on Dec. 28, 2018, in the United States Patent & Trademark Office, all of which are incorporated herein by reference in their entireties.

FIELD

The present disclosure is directed to advanced video coding technologies. More specifically, the present disclosure is directed to simplified most probable modes (MPMs) list generation scheme for zero line and non-zero lines.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4) [1]. In 2015, these two standard organizations jointly formed the JVET (Joint Video Exploration Team) to explore the potential of developing the next video coding standard beyond HEVC In October 2017, they issued the Joint Call for Proposals on Video Compression with Capability beyond HEVC (CfP). By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as Joint Video Expert Team.

The intra prediction modes used in HEVC are illustrated in FIG. 1. In HEVC, there are total 35 intra prediction modes, among which mode 10 is horizontal mode, mode 26 is vertical mode, and mode 2, mode 18 and mode 34 are diagonal modes. The intra prediction modes are signalled by three most probable modes (MPMs) and 32 remaining modes.

To code an intra mode, a most probable mode (MPM) list of size 3 is built based on the intra modes of the neighboring blocks. this MPM list will be referred to as the MPM list or primary MPM list. If intra mode is not from the MPM list, a flag is signalled to indicate whether intra mode belongs to the selected modes.

An example of the MPM list generation process for HEVC is shown is follows:

- If (leftIntraDir == aboveIntraDir && leftIntraDir > DC_IDX)
  - MPM [0] = leftIntraDir;
  - MPM [1] = ((leftIntraDir + offset) % mod) + 2;
  - MPM [2] = ((leftIntraDir − 1) % mod) + 2;
- Else if (leftIntraDir == aboveIntraDir)
  - MPM [0] = PLANAR_IDX;
  - MPM [1] = DC_IDX;
  - MPM [2] = VER_IDX;
- Else if (leftIntraDir != aboveIntraDir)
  - MPM [0] = leftIntraDir;
  - MPM [1] = aboveIntraDir;
  - If (leftIntraDir > 0 && aboveIntraDir > 0)
    - ■ MPM [2] = PLANAR_IDX;
  - Else
    - ■ MPM [2] = (leftIntraDir + aboveIntraDir) < 2 ? VERIDX : DC_IDX;

Here, leftIntraDir is used to indicate the mode in left block and aboveIntraDir is used to indicate the mode in the above block. If left or block is currently not available, leftIntraDir or aboveIntraDir will be to DC IDX. In addition, variable "offset" and "mod" are the constant values, which are set to 29 and 32 respectively.

SUMMARY

In an embodiment, there is provided a method of signaling an intra prediction mode used to encode a current block in an encoded video bitstream using at least one processor, including generating a first most probable mode (MPM) list corresponding to a zero reference line of the current block, wherein the first MPM list includes a plurality of angular intra prediction modes; generating a second MPM list corresponding to one or more non-zero reference lines of the current block, wherein the second MPM list includes the plurality of angular intra prediction modes; signaling a reference line index indicating a reference line used to encode the current block from among the zero reference line and the one or more non-zero reference lines; and signaling an intra mode index indicating the intra prediction mode within the first MPM list or the second MPM list.

In an embodiment, there is provided a device for signaling an intra prediction mode used to encode a current block in an encoded video bitstream, including: at least one memory configured to store program code; and at least one processor configured to read the program code and operate as instructed by the program code, the program code including: first generating code configured to cause the processor to generate a first most probable mode (MPM) list corresponding to a zero reference line of the current block, wherein the first MPM list includes a plurality of angular intra prediction modes; second generating code configured to cause the processor to generate a second MPM list corresponding to one or more non-zero reference lines of the current block, wherein the second MPM list includes the plurality of angular intra prediction modes; first signaling code configured to cause the processor to signal a reference line index indicating a reference line used to encode the current block from among the zero reference line and the one or more non-zero reference lines; and second signaling code configured to cause the processor to signal an intra mode index indicating the intra prediction mode within the first MPM list or the second MPM list.

In an embodiment, there is provided a non-transitory computer-readable medium storing instructions, the instructions including: one or more instructions that, when executed by one or more processors of a device for signaling an intra prediction mode used to encode a current block in an encoded video bitstream, cause the one or more processors to: generate a first most probable mode (MPM) list corresponding to a zero reference line of the current block, wherein the first MPM list includes a plurality of angular intra prediction modes; generate a second MPM list corresponding to one or more non-zero reference lines of the current block, wherein the second MPM list includes the plurality of angular intra prediction modes; signal a reference line index indicating a reference line used to encode the current block from among the zero reference line and the one or more non-zero reference lines; and signal an intra mode index indicating the intra prediction mode within the first MPM list or the second MPM list.

BRIEF DESCRIPTION OF THE DRAWINGS

Further features, the nature, and various advantages of the disclosed subject matter will be more apparent from the following detailed description and the accompanying drawings in which:

FIG. 10 is a diagram of a computer system according to an embodiment.

DETAILED DESCRIPTION

Figure 1:
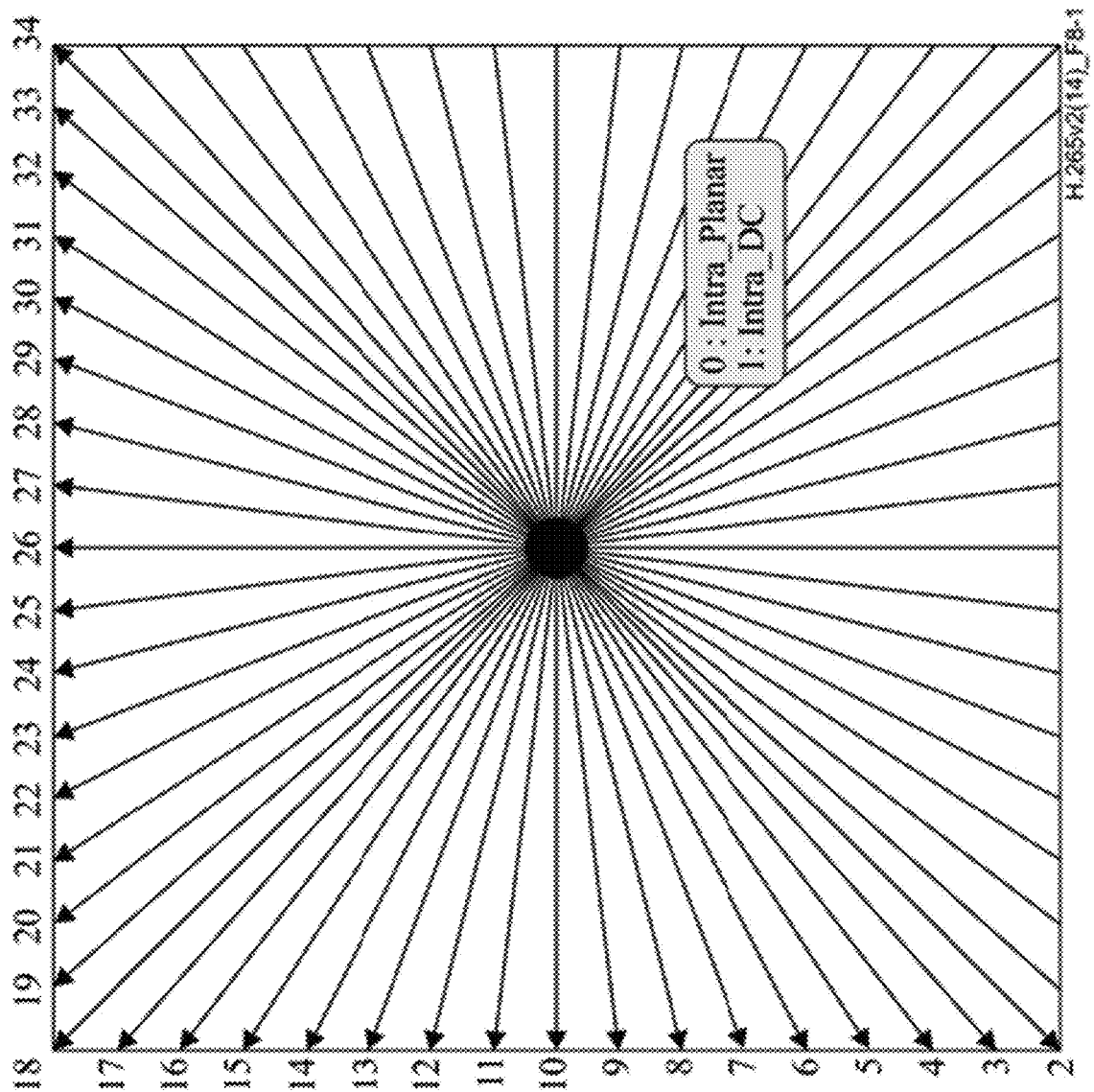
FIG. 1 is a diagram of an example of intra prediction modes in HEVC.
Figure 2:
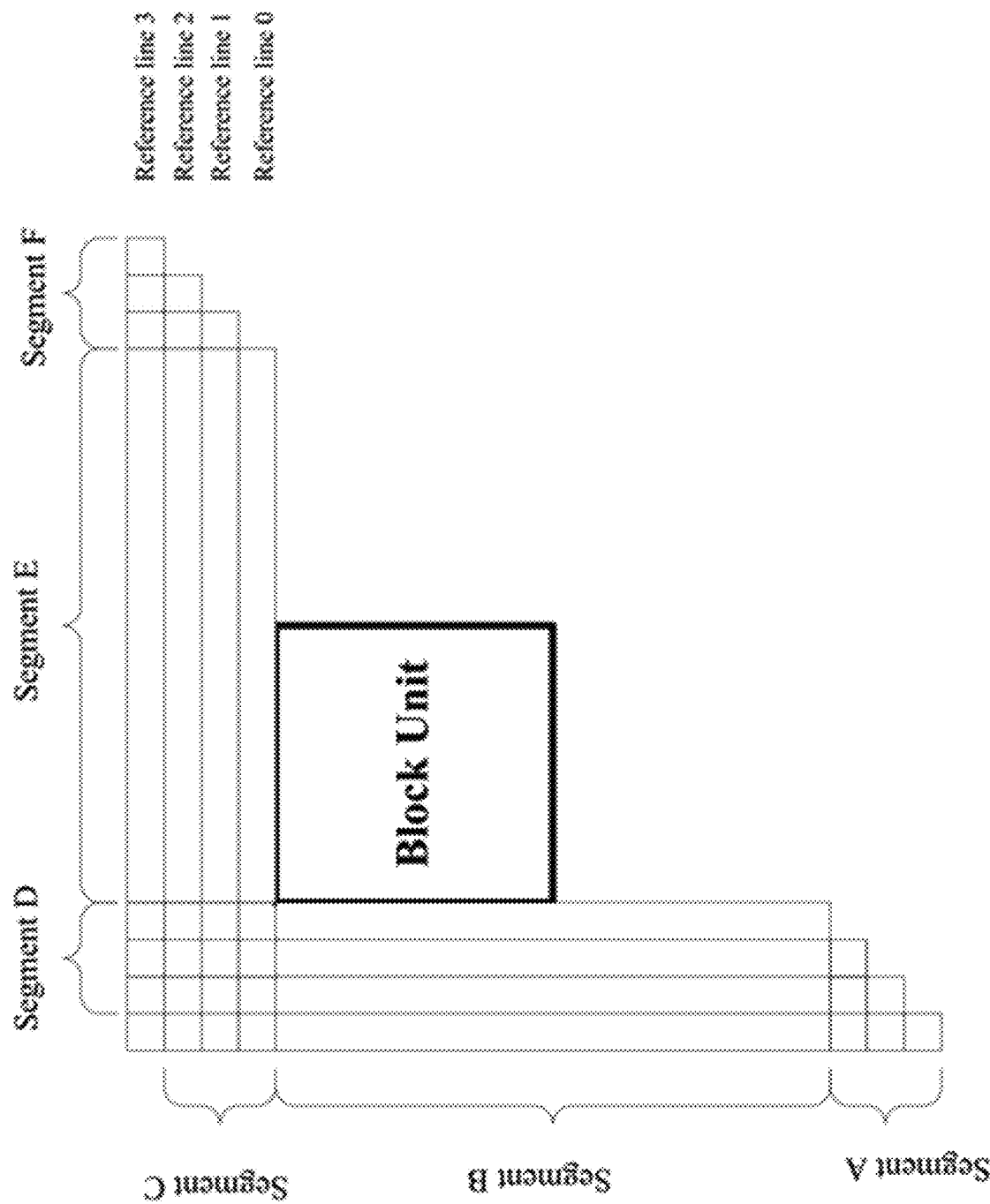
FIG. 2 is a diagram showing an example of reference lines adjacent to a coding block unit.

Multi-line intra prediction was proposed to use more reference lines for intra prediction, and encoder decides and signals which reference line is used to generate the intra predictor. The reference line index is signaled before intra prediction modes, and only the most probable modes are allowed in case a nonzero reference line index is signaled. In FIG. 2, an example of 4 reference lines is depicted, where each reference line is composed of six segments, i.e., Segment A to F, together with the top-left reference sample. In addition, Segment A and F are padded with the closest samples from Segment B and E, respectively.

Figure 3:
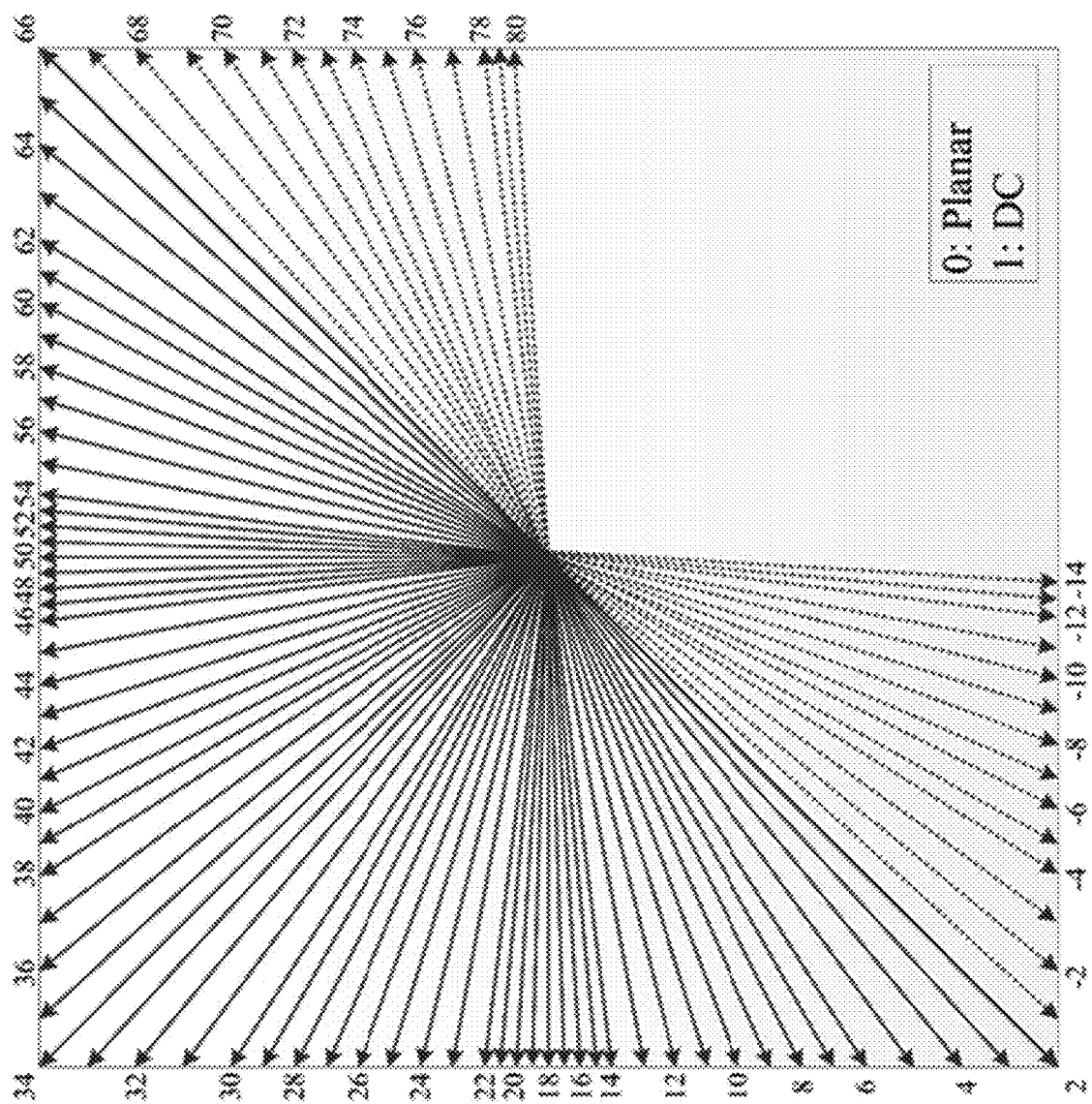
FIG. 3 is a diagram of an example of intra prediction modes in VVC.

In VVC, there may be a total 95 intra prediction modes as shown in FIG. 3, where mode 18 is horizontal mode, mode 50 is vertical mode, and mode 2, mode 34 and mode 66 are diagonal modes. Modes −1~−14 and Modes 67~80 are called Wide-Angle Intra Prediction (WAIP) modes.

Figure 4:
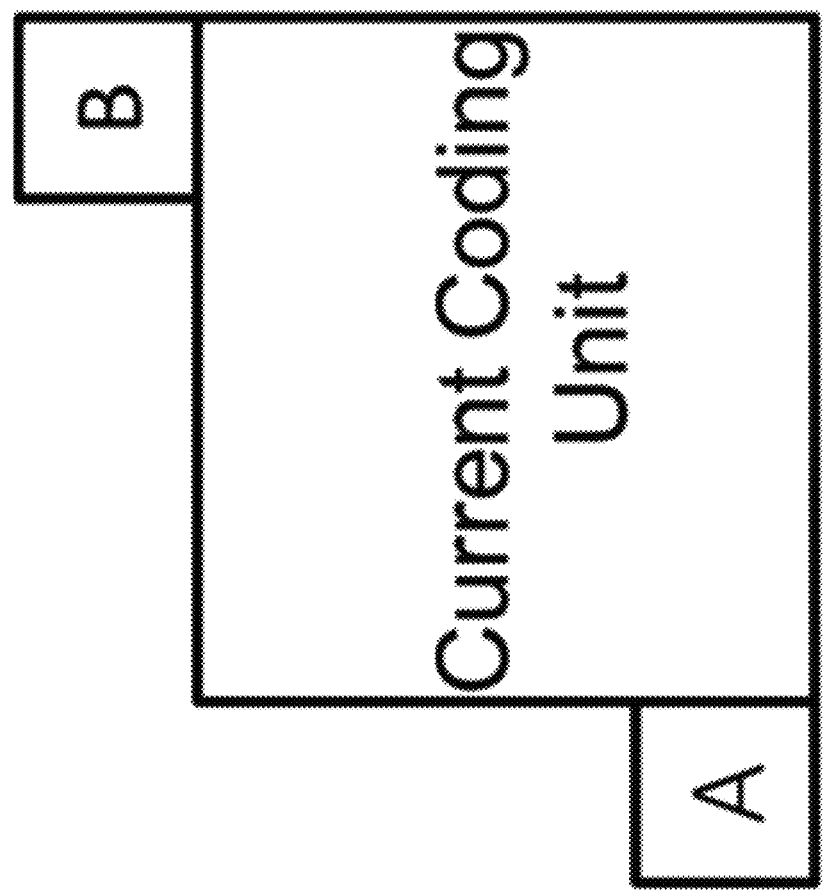
FIG. 4 is a diagram of an example of positions of neighboring CUs

In VTM3.0, the size of MPM list is set equal to 6 for both the adjacent reference line (also referred to zero reference line) and non-adjacent reference lines (also referred to non-zero reference lines). The positions of neighboring modes used to derive 6 MPM candidates are also the same for adjacent and non-adjacent reference lines, which is illustrated in FIG. 4. In FIG. 4, the block A and block B denote the above and left neighboring coding unit of current coding unit, and variables candIntraPredModeA and candIntraPredModeB indicate the associated intra prediction modes of block A and B respectively. candIntraPredModeA and candIntraPredModeB are initially set equal to INTRA PLANAR. If block A (or B) is marked as available, candIntraPredModeA (or candIntraPredModeB) is set equal to the actual intra prediction mode of block A (or B).

MPM candidate derivation process is different for adjacent and non-adjacent reference lines. For zero reference line, if both two neighboring modes are Planar or DC mode, default modes are used to construct the MPM list, 2 of them are Planar and DC modes, and the remaining 4 modes are angular modes, which may also be referred to as angular default modes. For non-zero reference lines, if both two neighboring modes are Planar or DC mode, 6 angular default modes are used to construct the MPM list.

An example of an MPM list derivation process is shown below, wherein candModeList[x] with x=0..5 denotes the 6 MPM candidates, IntraLumaRefLineIdx[xCb][yCb] denotes the reference line index of the block to be predicted, and IntraLumaRefLineIdx[xCb][yCb] can be 0,1, or 3.

- If candIntraPredModeB is equal to candIntraPredModeA and candIntraPredModeA is greater than INTRA_DC, candModeList[ x ] with x = 0..5 is derived as follows:
- If IntraLumaRefLineIdx[ xCb ][ yCb ] is equal to 0, the following applies:
    candModeList[ 0 ] = candIntraPredModeA
    candModeList[ 1 ] = INTRA_PLANAR
    candModeList[ 2 ] = INTRA_DC
    candModeList[ 3 ] = 2 + ( ( candIntraPredModeA + 61) % 64 )
    candModeList[ 4 ] = 2 + ( ( candIntraPredModeA − 1) % 64 )
    candModeList[ 5 ] = 2 + ( ( candIntraPredModeA + 60 ) % 64 )
- Otherwise (IntraLumaRefLineIdx[ xCb ][ yCb ] is not equal to 0), the following applies:
    candModeList[ 0 ] = candIntraPredModeA
    candModeList[ 1 ] = 2 + ( ( candIntraPredModeA + 61) % 64 )
    candModeList[ 2 ] = 2 + ( ( candIntraPredModeA − 1) % 64 )
    candModeList[ 3 ] = 2 + ( ( candIntraPredModeA + 60 ) % 64 )
    candModeList[ 4 ] = 2 + ( candIntraPredModeA % 64 )
    candModeList[ 5 ] = 2 + ( ( candIntraPredModeA + 59 ) % 64 )
- Otherwise if candIntraPredModeB is not equal to candIntraPredModeA and candIntraPredModeA or candIntraPredModeB is greater than INTRA_DC, the following applies:
- The variables minAB and maxAB are derived as follows:
    min AB = candModeList[ (candModeList[ 0 ] > candModeList[ 1 ] ) ? 1 : 0 ]
    maxAB = candModeList[ (candModeList[ 0 ] > candModeList[ 1 ] ) ? 0 : 1 ]

-continued

- If candIntraPredModeA and candIntraPredModeB are both greater than
  INTRA_DC, candModeList[ x ] with x = 0..5 is derived as follows:
    candModeList[ 0 ] = candIntraPredModeA
    candModeList[ 1 ] = candIntraPredModeB
    - If IntraLumaRefLineIdx[ xCb ][ yCb ] is equal to 0, the following applies:
        candModeList[ 2 ] = INTRA_PLANAR
        candModeList[ 3 ] = INTRA DC
        - If maxAB − minAB is in the range of 2 to 62, inclusive, the following
          applies:
            candModeList[ 4 ] = 2 + ( ( maxAB + 61 ) % 64 )
            candModeList[ 5 ] = 2 + ( ( maxAB − 1 ) % 64 )
        - Otherwise, the following applies:
            candModeList[ 4 ] = 2 + ( ( maxAB + 60 ) % 64 )
            candModeList[ 5 ] = 2 + ( ( maxAB ) % 64 )
    - Otherwise (IntraLumaRefLineIdxf xCb ][ yCb ] is not equal to 0), the
      following applies:
        - If maxAB − minAB is equal to 1, the following applies:
            candModeList[ 2 ] = 2 + ( ( minAB + 61 ) % 64 )
            candModeList[ 3 ] = 2 + ( ( maxAB − 1 ) % 64 )
            candModeList[ 4 ] = 2 + ( ( minAB + 60 ) % 64 )
            candModeList[ 5 ] = 2 + ( maxAB % 64 )
        - Otherwise if maxAB − minAB is equal to 2, the following applies:
            candModeList[ 2 ] = 2 + ( ( minAB − 1 ) % 64 )
            candModeList[ 3 ] = 2 + ( ( minAB + 61 ) % 64 )
            candModeList[ 4 ] = 2 + ( ( maxAB − 1 ) % 64 )
            candModeList[ 5 ] = 2 + ( ( minAB + 60 ) % 64 )
        - Otherwise if maxAB − minAB is greater than 61, the following applies:
            candModeList[ 2 ] = 2 + ( ( minAB − 1 ) % 64 )
            candModeList[ 3 ] = 2 + ( ( maxAB + 61 ) % 64 )
            candModeList[ 4 ] = 2 + ( minAB % 64 )
            candModeList[ 5 ] = 2 + ( ( maxAB + 60 ) % 64 )
        - Otherwise, the following applies:
            candModeList[ 2 ] = 2 + ( ( minAB + 61 ) % 64 )
            candModeList[ 3 ] = 2 + ( ( minAB − 1 ) % 64 )
            candModeList[ 4 ] = 2 + ( ( maxAB + 61 ) % 64 )
            candModeList[ 5 ] = 2 + ( ( maxAB − 1 ) % 64 )
- Otherwise (candIntraPredModeA or candIntraPredModeB is greater than
  INTRA_DC), candModeList[ x ] with x = 0..5 is derived as follows:
    - If IntraLumaRefLineIdx[ xCb ][ yCb ] is equal to 0, the following applies:
        candModeList[ 0 ] = candIntraPredModeA
        candModeList[ 1 ] = candIntraPredModeB
        candModeList[ 2 ] = 1 − minAB
        candModeList[ 3 ] = 2 + ( ( maxAB + 61 ) % 64 )
        candModeList[ 4 ] = 2 + ( ( maxAB − 1 ) % 64 )
        candModeList[ 5 ] = 2 + ( ( maxAB + 60 ) % 64 )
    - Otherwise (IntraLumaRefLineIdx[ xCb ][ yCb ] is not equal to 0), the
      following applies:
        candModeList[ 0 ] = maxAB
        candModeList[ 1 ] = 2 + ( ( maxAB + 61 ) % 64 )
        candModeList[ 2 ] = 2 + ( ( maxAB − 1 ) % 64 )
        candModeList[ 3 ] = 2 + ( ( maxAB + 60 ) % 64 )
        candModeList[ 4 ] = 2 + ( maxAB % 64 )
        candModeList[ 5 ] = 2 + ( ( maxAB + 59 ) % 64 )
- Otherwise, the following applies:
    - If IntraLumaRefLineIdx[ xCb ][ yCb ] is equal to 0, the following applies:
        candModeList[ 0 ] = candIntraPredModeA
        candModeList[ 1 ] =
        (candModeList[0] == INTRA_PLANAR ) ? INTRA_DC : INTRA_PLANAR
        candModeList[ 2 ] = INTRA ANGULAR50
        candModeList[ 3 ] = INTRA_ANGULAR18
        candModeList[ 4 ] = INTRA ANGULAR46
        candModeList[ 5 ] = INTRA ANGULAR54
    - Otherwise (IntraLumaRefLineIdx[ xCb ][ yCb ] is not equal to 0), the following
      applies:
        candModeList[ 0 ] = INTRA ANGULAR50
        candModeList[ 1 ] = INTRA_ANGULAR18
        candModeList[ 2 ] = INTRA_ANGULAR2
        candModeList[ 3 ] = INTRA_ANGULAR34
        candModeList[ 4 ] = INTRA_ANGULAR66
        candModeList 5 ] = INTRA_ANGULAR26

In VTM4.0, the size of MPM list is extended to 6. When intra_luma_mpm_flag is true, it indicates that current mode belongs to the candidates in MPM list. Consider Table 1 below:

TABLE 1

| coding_unit( x0, y0, cbWidth, cbHeight, treeType ) { | Descriptor |
|---|---|
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0 % CtbSizeY ) > 0 ) | |
|           intra_luma_ref_idx[ x0 ][ y0 ] | ae(v) |
|         if (intra_luma_ref_idx[ x0 ] [ y0 ] = = 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ] [ y0 ] = = 1 && | |
|           cbWidth <= MaxTbSizeY && cbHeight <= MaxTbSizeY ) | |
|           intra_subpartitions_split_flag[ x0 ][y0 ] | ae(v) |
|         if( intra_luma_ref_idx[ x0 ] [ y0 ] = = 0 && | |
|           intra_subpartitions_mode_flag[ x0 ] [ y0 ] = = 0 ) | |
|           intra luma_mpm_flag[ x0 ] [ y0 ] | ae(v) |
|         if( intra_luma_mpm_flag[ x0 ] [ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |
|         intra_chroma_pred_mode[ x0 ][ y0 ] | ae(v) |
|     } | |
|   } | |

Figure 5:
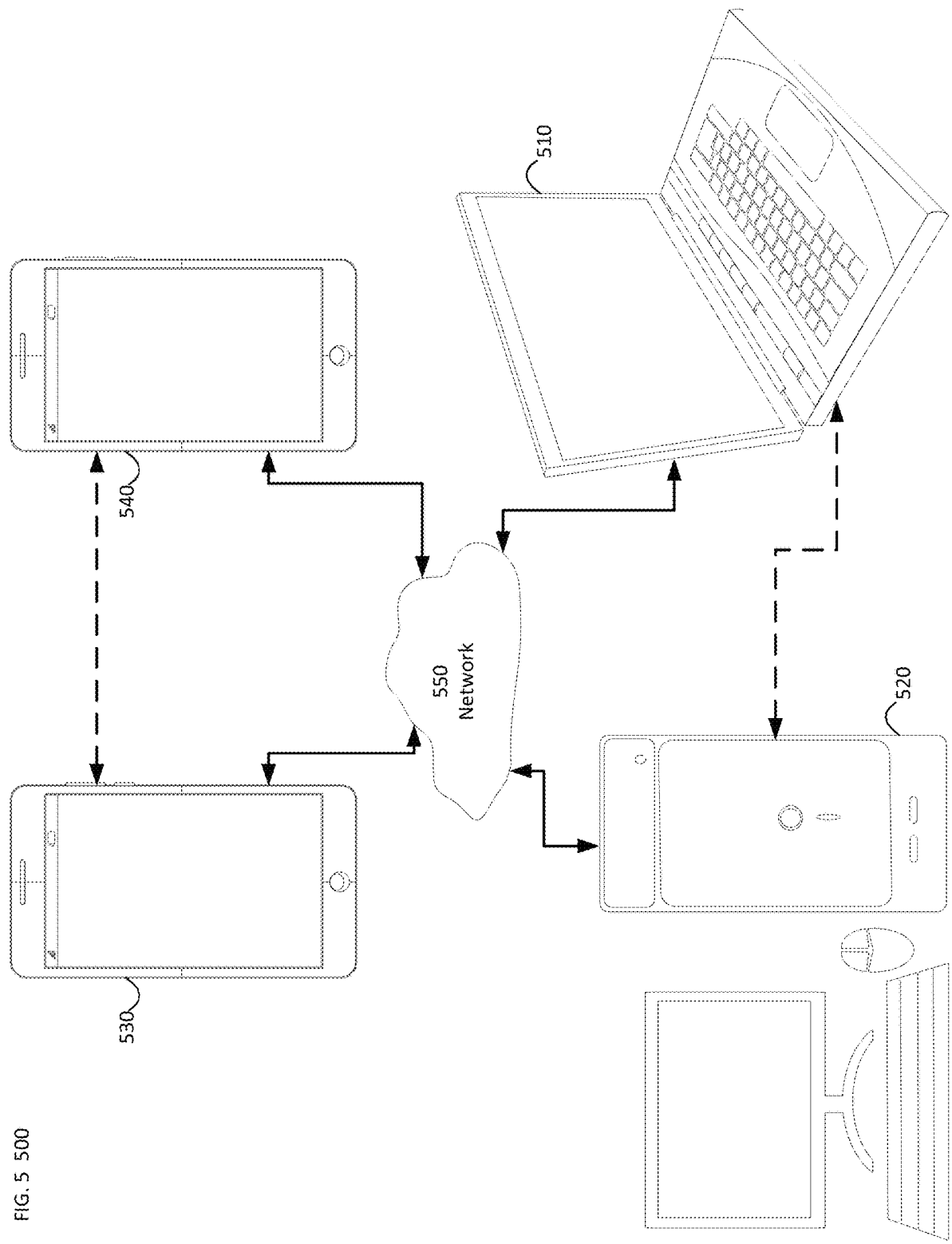
FIG. 5 is a simplified block diagram of a communication system according to an embodiment.

FIG. 5 illustrates a simplified block diagram of a communication system (300) according to an embodiment of the present disclosure. The communication system (300) may include at least two terminals (510-520) interconnected via a network (550). For unidirectional transmission of data, a first terminal (510) may code video data at a local location for transmission to the other terminal (520) via the network (550). The second terminal (520) may receive the coded video data of the other terminal from the network (550), decode the coded data and display the recovered video data. Unidirectional data transmission may be common in media serving applications and the like.

FIG. 5 illustrates a second pair of terminals (530, 540) provided to support bidirectional transmission of coded video that may occur, for example, during videoconferencing. For bidirectional transmission of data, each terminal (530, 540) may code video data captured at a local location for transmission to the other terminal via the network (550). Each terminal (530, 540) also may receive the coded video data transmitted by the other terminal, may decode the coded data and may display the recovered video data at a local display device.

In FIG. 5, the terminals (510-540) may be illustrated as servers, personal computers and smart phones but the principles of the present disclosure are not so limited. Embodiments of the present disclosure find application with laptop computers, tablet computers, media players and/or dedicated video conferencing equipment. The network (550) represents any number of networks that convey coded video data among the terminals (510-540), including for example wireline and/or wireless communication networks. The communication network (550) may exchange data in circuit-switched and/or packet-switched channels. Representative networks include telecommunications networks, local area networks, wide area networks and/or the Internet. For the purposes of the present discussion, the architecture and topology of the network (550) may be immaterial to the operation of the present disclosure unless explained herein below.

Figure 6:
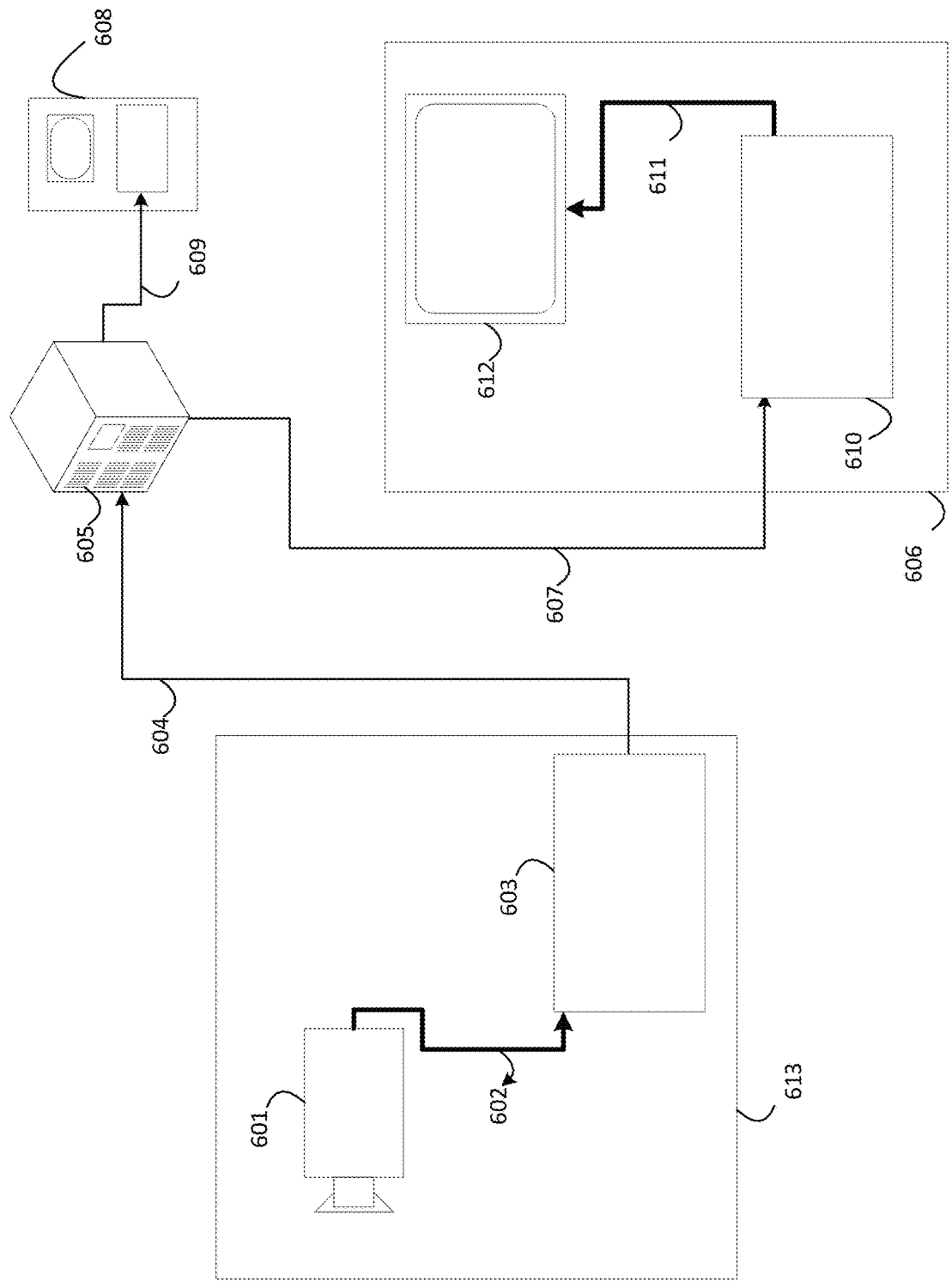
FIG. 6 is a diagram of the placement of a video encoder and decoder in a streaming environment according to an embodiment.

FIG. 6 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (613), that can include a video source (601), for example a digital camera, creating, for example, an uncompressed video sample stream (602). That sample stream (602), depicted as a bold line to emphasize a high data volume when compared to encoded video bitstreams, can be processed by an encoder (603) coupled to the camera 601). The encoder (603) can include hardware, software, or a combination thereof to enable or implement aspects of the disclosed subject matter as described in more detail below. The encoded video bitstream (604), depicted as a thin line to emphasize the lower data volume when compared to the sample stream, can be stored on a streaming server (605) for future use. One or more streaming clients (606, 608) can access the streaming server (605) to retrieve copies (607, 609) of the encoded video bitstream (604). A client (606) can include a video decoder (610) which decodes the incoming copy of the encoded video bitstream (607) and creates an outgoing video sample stream (611) that can be rendered on a display (612) or other rendering device (not depicted). In some streaming systems, the video bitstreams (604, 607, 609) can be encoded according to certain video coding/compression standards. Examples of those standards include ITU-T Recommendation H.265. Under development is a video coding standard informally known as Versatile Video Coding (VVC). The disclosed subject matter may be used in the context of VVC.

Figure 7:
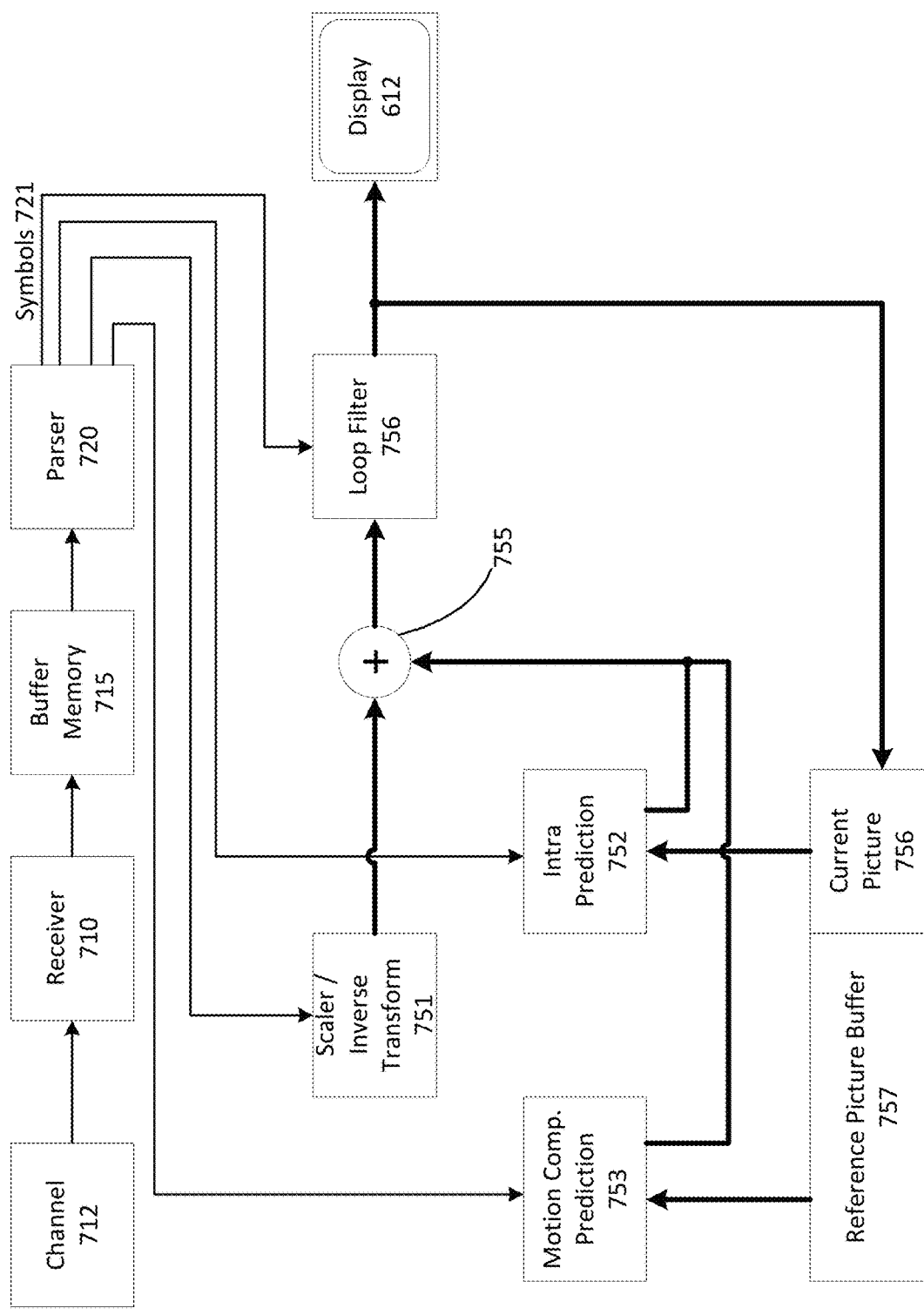
FIG. 7 is a functional block diagram of a video decoder according to an embodiment.

FIG. 7 may be a functional block diagram of a video decoder (610) according to an embodiment of the present invention.

A receiver (710) may receive one or more codec video sequences to be decoded by the decoder (610); in the same or another embodiment, one coded video sequence at a time, where the decoding of each coded video sequence is independent from other coded video sequences. The coded video sequence may be received from a channel (712), which may be a hardware/software link to a storage device which stores the encoded video data. The receiver (710) may receive the encoded video data with other data, for example, coded audio data and/or ancillary data streams, that may be forwarded to their respective using entities (not depicted). The receiver (710) may separate the coded video sequence from the other data. To combat network jitter, a buffer memory (715) may be coupled in between receiver (710) and entropy decoder/parser (720) ("parser" henceforth). When receiver (710) is receiving data from a store/forward device of sufficient bandwidth and controllability, or from an isosychronous network, the buffer (715) may not be needed, or can be small. For use on best effort packet networks such as the Internet, the buffer (715) may be required, can be comparatively large and can advantageously of adaptive size.

The video decoder (610) may include a parser (720) to reconstruct symbols (721) from the entropy coded video sequence. Categories of those symbols include information used to manage operation of the decoder (610), and potentially information to control a rendering device such as a display (612) that is not an integral part of the decoder but can be coupled to it, as was shown in FIG. 7. The control information for the rendering device(s) may be in the form of Supplementary Enhancement Information (SEI messages) or Video Usability Information (VUI) parameter set fragments (not depicted). The parser (720) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (720) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (720) may perform entropy decoding/parsing operation on the video sequence received from the buffer (715), so to create symbols (721). The parser (720) may receive encoded data, and selectively decode particular symbols (721). Further, the parser (720) may determine whether the particular symbols (721) are to be provided to a Motion Compensation Prediction unit (753), a scaler/inverse transform unit (751), an Intra Prediction Unit (752), or a loop filter (756).

Reconstruction of the symbols (721) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (720). The flow of such subgroup control information between the parser (720) and the multiple units below is not depicted for clarity.

Beyond the functional blocks already mentioned, decoder (610) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (751). The scaler/inverse transform unit (751) receives quantized transform coefficient as well as control information, including which transform to use, block size, quantization factor, quantization scaling matrices, etc. as symbol(s) (621) from the parser (720). It can output blocks comprising sample values, that can be input into aggregator (755).

In some cases, the output samples of the scaler/inverse transform (751) can pertain to an intra coded block; that is: a block that is not using predictive information from previously reconstructed pictures, but can use predictive information from previously reconstructed parts of the current picture. Such predictive information can be provided by an intra picture prediction unit (752). In some cases, the intra picture prediction unit (752) generates a block of the same size and shape of the block under reconstruction, using surrounding already reconstructed information fetched from the current (partly reconstructed) picture (756). The aggregator (755), in some cases, adds, on a per sample basis, the prediction information the intra prediction unit (752) has generated to the output sample information as provided by the scaler/inverse transform unit (751).

In other cases, the output samples of the scaler/inverse transform unit (751) can pertain to an inter coded, and potentially motion compensated block. In such a case, a Motion Compensation Prediction unit (753) can access reference picture memory (757) to fetch samples used for prediction. After motion compensating the fetched samples in accordance with the symbols (721) pertaining to the block, these samples can be added by the aggregator (755) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (721) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (755) can be subject to various loop filtering techniques in the loop filter unit (756). Video compression technologies can include in-loop filter technologies that are controlled by parameters included in the coded video bitstream and made available to the loop filter unit (756) as symbols (721) from the parser (720), but can also be responsive to meta-information obtained during the decoding of previous (in decoding order) parts of the coded picture or coded video sequence, as well as responsive to previously reconstructed and loop-filtered sample values.

The output of the loop filter unit (756) can be a sample stream that can be output to the render device (612) as well as stored in the reference picture memory (756) for use in future inter-picture prediction.

Certain coded pictures, once fully reconstructed, can be used as reference pictures for future prediction. Once a coded picture is fully reconstructed and the coded picture has been identified as a reference picture (by, for example, parser (720)), the current reference picture (656) can become part of the reference picture buffer (757), and a fresh current picture memory can be reallocated before commencing the reconstruction of the following coded picture.

The video decoder (610) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (710) may receive additional (redundant) data with the encoded video. The additional data may be included as part of the coded video sequence(s). The additional data may be used by the video decoder (610) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 8:
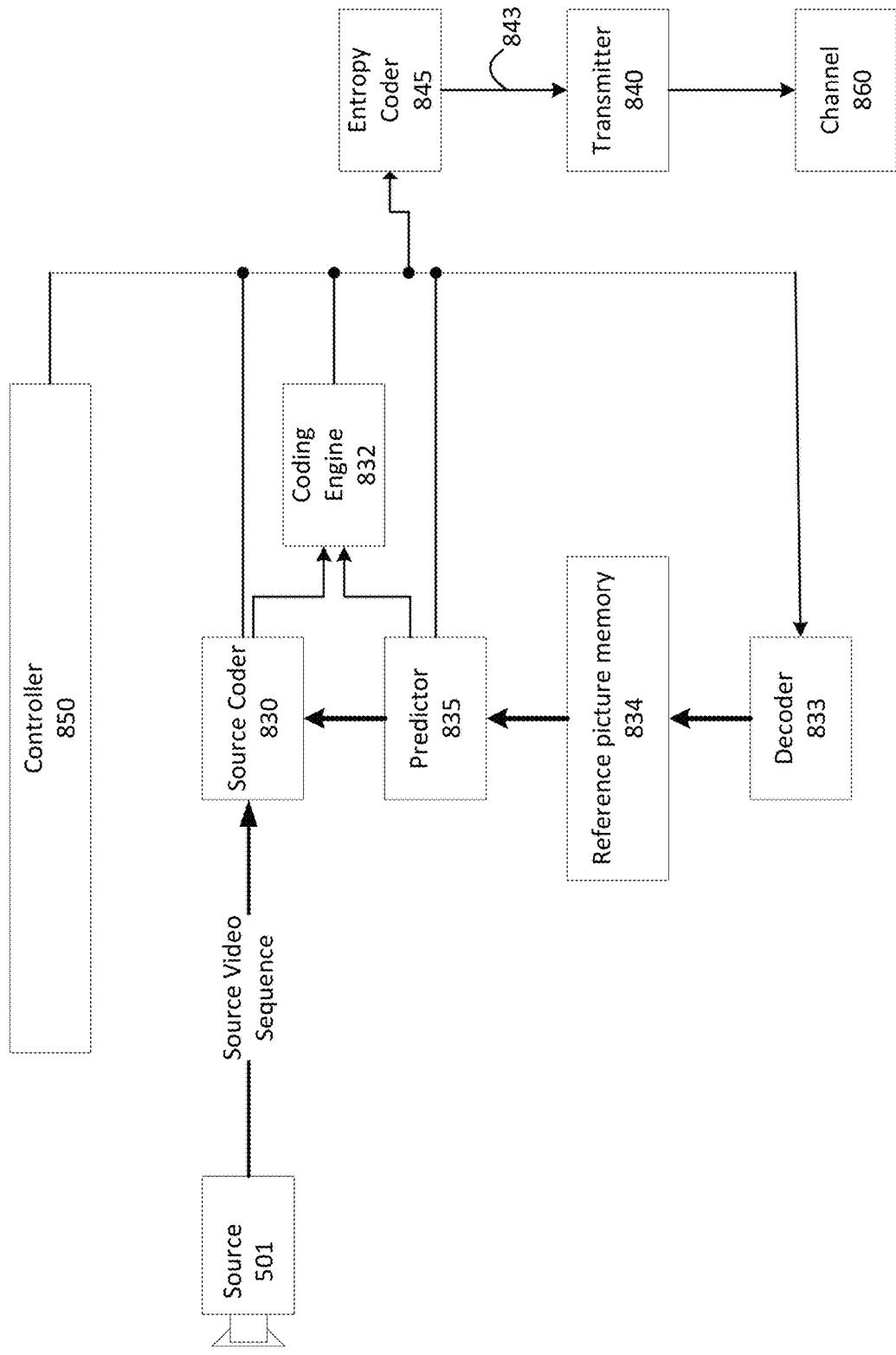
FIG. 8 is a functional block diagram of a video encoder according to an embodiment.

FIG. 8 may be a functional block diagram of a video encoder (603) according to an embodiment of the present disclosure.

The encoder (603) may receive video samples from a video source (601) (that is not part of the encoder) that may capture video image(s) to be coded by the encoder (603).

The video source (601) may provide the source video sequence to be coded by the encoder (603) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (601) may be a storage device storing previously prepared video. In a videoconferencing system, the video source (603) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the encoder (603) may code and compress the pictures of the source video sequence into a coded video sequence (843) in real time or under any other time constraints as required by the application. Enforcing appropriate coding speed is one function of Controller (850). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (850) as they may pertain to video encoder (603) optimized for a certain system design.

Some video encoders operate in what a person skilled in the art readily recognizes as a "coding loop." As an oversimplified description, a coding loop can consist of the encoding part of an encoder (830) ("source coder" henceforth) (responsible for creating symbols based on an input picture to be coded, and a reference picture(s)), and a (local) decoder (833) embedded in the encoder (603) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (834). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (833) can be the same as of a "remote" decoder (610), which has already been described in detail above in conjunction with FIG. 7. Briefly referring also to FIG. 6, however, as symbols are available and en/decoding of symbols to a coded video sequence by entropy coder (845) and parser (720) can be lossless, the entropy decoding parts of decoder (610), including channel (712), receiver (710), buffer (715), and parser (720) may not be fully implemented in local decoder (833).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (830) may perform motion compensated predictive coding, which codes an input frame predictively with reference to one or more previously-coded frames from the video sequence that were designated as "reference frames." In this manner, the coding engine (832) codes differences between pixel blocks of an input frame and pixel blocks of reference frame(s) that may be selected as prediction reference(s) to the input frame.

The local video decoder (833) may decode coded video data of frames that may be designated as reference frames, based on symbols created by the source coder (830). Operations of the coding engine (832) may advantageously be lossy processes. When the coded video data may be decoded at a video decoder (not shown in FIG. 6), the reconstructed video sequence typically may be a replica of the source video sequence with some errors. The local video decoder (833) replicates decoding processes that may be performed by the video decoder on reference frames and may cause reconstructed reference frames to be stored in the reference picture cache (834). In this manner, the encoder (603) may store copies of reconstructed reference frames locally that have common content as the reconstructed reference frames that will be obtained by a far-end video decoder (absent transmission errors).

The predictor (835) may perform prediction searches for the coding engine (832). That is, for a new frame to be coded, the predictor (835) may search the reference picture memory (834) for sample data (as candidate reference pixel blocks) or certain metadata such as reference picture motion vectors, block shapes, and so on, that may serve as an appropriate prediction reference for the new pictures. The predictor (835) may operate on a sample block-by-pixel block basis to find appropriate prediction references. In some cases, as determined by search results obtained by the predictor (835), an input picture may have prediction references drawn from multiple reference pictures stored in the reference picture memory (834).

The controller (850) may manage coding operations of the video coder (830), including, for example, setting of parameters and subgroup parameters used for encoding the video data.

Output of all aforementioned functional units may be subjected to entropy coding in the entropy coder (845). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (840) may buffer the coded video sequence(s) as created by the entropy coder (845) to prepare it for transmission via a communication channel (860), which may be a hardware/software link to a storage device which would store the encoded video data. The transmitter (840) may merge coded video data from the video coder (830) with other data to be transmitted, for example, coded audio data and/or ancillary data streams (sources not shown).

The controller (850) may manage operation of the encoder (603). During coding, the controller (850) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (603) may perform coding operations according to a predetermined video coding technology or standard, such as ITU-T Rec. H.265. In its operation, the video coder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (840) may transmit additional data with the encoded video. The video coder (830) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

As discussed above, in VTM3.0, MPM list candidate derivation process may be different for adjacent reference line and non-adjacent reference lines. As a result, MPM list candidate derivation process may be complicated in each case without clear benefit in coding efficiency.

Further, in VTM3.0, when the signaled reference line index is 0 and one of the left and above neighboring mode is equal to or less than DC mode and the other one of the left and above neighboring mode is greater than DC mode, left neighboring mode is always inserted into MPM list followed by the above neighboring mode even though above neighboring mode is Planar or DC mode. This may not be the best solution, because Planar and DC modes are the most frequently used intra prediction modes from the statistics.

The proposed methods may be used separately or combined in any order. In embodiments, the line index of the nearest reference line may be 0, and the nearest reference line may be referred to as the zero reference line. Other lines may be referred to as non-zero reference lines. In the description below, candModeList may denote the MPM list, RefLineIdx may denote the reference line index of current block, candIntraPredModeA and candIntraPredModeB may denote the left and above neighboring modes. If one neighboring mode is not Planar or DC mode, or one neighboring mode is generating prediction samples according a given prediction direction, such as intra prediction mode 2~66 as defined in VVC draft 2, this mode may be referred to as an angular mode. If one mode is Planar or DC mode, this mode may be referred to as a non-angular mode. Each intra prediction mode may be associated with a mode number, which may be referred to as an intra prediction mode index. For example, Planar, DC, horizontal and vertical intra prediction modes may be associated with mode number 0, 1, 18 and 50, respectively.

In an embodiment, the variables minAB and maxAB may be derived as follows:
　　candModeList[0]=candIntraPredModeA
　　candModeList[1]=candIntraPredModeB
　　minAB=candModeList[(candModeList[0]>candModeList[1])?1:0]
　　maxAB=candModeList[(candModeList[0]>candModeList[1])?0:1]

In an embodiment, the variables offset and mod may be set according to either one of the following two scenarios: offset=61, mod=64; offset=62, mod=65.

In an embodiment, when a non-zero reference line index is signaled, MPM list candidates may be derived by using the same rule if the absolute mode number difference between left and above neighboring modes is larger than or equal to a given threshold value.

In one embodiment, the given threshold value may be 0, which means, MPM list candidates are derived by using the same rule regardless of the mode number difference between left and above neighboring modes.

In another embodiment, the left and above neighboring modes are both angular modes, and the given threshold value may be 1, 2 or 3. In one example, the MPM list candidates may be derived as follows:
　　candModeList[0]=candIntraPredModeA
　　candModeList[1]=candIntraPredModeB
　　candModeList[2]=2+((minAB+offset) % mod)
　　candModeList[3]=2+((minAB−1) % mod)
　　candModeList[4]=2+((maxAB+offset) % mod)
　　candModeList[5]=2+((maxAB−1) % mod)

In another embodiment, the left and above neighboring modes are both angular modes, and mode number difference of these two modes is equal to 1 or 2, MPM list candidates may be derived by using the same rule. In one example, the MPM list candidates may be derived as follows:
　　candModeList[0]=candIntraPredModeA
　　candModeList[1]=candIntraPredModeB
　　candModeList[2]=2+((minAB+offset) % mod)
　　candModeList[3]=2+((maxAB−1) % mod)
　　candModeList[4]=2+((minAB+offset−1) % mod)
　　candModeList[5]=2+(maxAB % mod)

In another embodiment, if left and above neighboring modes are not equal, MPM list candidates may be derived by using the same rule regardless of the mode number difference between left and above neighboring modes.

In one embodiment, if the left and above neighboring modes are both angular modes but they are not equal, MPM list candidates are derived by using the same rule regardless of the mode number difference between left and above neighboring modes.

In one example, 6 MPM candidates may be derived as follows:
　　candModeList[0]=candIntraPredModeA
　　candModeList[1]=candIntraPredModeB
　　candModeList[2]=2+((minAB+offset) % mod)
　　candModeList[3]=2+((minAB−1) % mod)
　　candModeList[4]=2+((maxAB+offset) % mod)
　　candModeList[5]=2+((maxAB−1) % mod)

In another example, 6 MPM candidates may be derived as follows:
　　candModeList[0]=candIntraPredModeA
　　candModeList[1]=candIntraPredModeB
　　candModeList[2]=2+((minAB+offset) % mod)
　　candModeList[3]=2+((maxAB−1) % mod)
　　candModeList[4]=2+((minAB−1) % mod)
　　candModeList[5]=2+((maxAB+offset) % mod)

In another example, 6 MPM candidates may be derived as follows:
　　candModeList[0]=candIntraPredModeA
　　candModeList[1]=candIntraPredModeB
　　candModeList[2]=2+((maxAB+offset) % mod)
　　candModeList[3]=2+((maxAB−1) % mod)
　　candModeList[4]=2+((minAB+offset) % mod)
　　candModeList[5]=2+((minAB−1) % mod)

In another example, 6 MPM candidates may be derived as follows:
　　candModeList[0]=candIntraPredModeA
　　candModeList[1]=candIntraPredModeB
　　candModeList[2]=2+((candIntraPredModeA+offset) % mod)
　　candModeList[3]=2+((candIntraPredModeA−1) % mod)
　　candModeList[4]=2+((candIntraPredModeB+offset) % mod)
　　candModeList[5]=2+((candIntraPredModeB−1) % mod)

In another embodiment, if at least one of the left and above is angular mode, MPM list candidates are derived by using the same rule regardless of the mode number difference between left and above neighboring modes.

In embodiments, there may be duplicated mode candidates in MPM list for non-zero reference lines when both two neighboring modes are angular modes.

In one embodiment, there are redundant mode candidates in MPM list for non-zero reference lines when both two neighboring modes are angular modes and absolute value of mode number difference of these two neighboring modes is equal to 1 or 2, or greater than Thres, which may be a positive integer, for example one of 61, 62, 63 or 64.

In another embodiment, it is restricted that there are no duplicated mode candidates in MPM list for the zero-reference line.

In another embodiment, there may be duplicated mode candidates in MPM list for non-zero reference lines when both two neighboring modes are angular modes and not equal.

In an embodiment, the angular modes used for constructing zero reference line MPM list may be reused for a non-zero line MPM list, and these angular MPM modes may have the same index for both the zero and non-zero reference line MPM list.

In one example, the MPM list for the zero line may be {26, 18, 0, 1, 25, 27}, wherein 26, 18, 25, and 27 are the angular modes. So, for non-zero lines, these 4 angular modes may also be used with the same index, and one example of the MPM list for the non-zero lines may be {26, 18, 17, 19, 25, 27}.

In one embodiment, the default angular modes used for constructing zero reference line MPM list are reused for non-zero line MPM list and these angular MPM modes have the same MPM index for both zero and non-zero reference line MPM lists. Variable K is a positive integer. In one example, K is equal to 4.

In one example, the default modes for zero and non-zero reference lines are {Planar, DC, vertical, horizontal, vertical−K, vertical+K} and {2, 34, vertical, horizontal, vertical−K, vertical+K} respectively. This can be formulated as follows:

candModeList[0]=RefLineIdx==0?Planar: 2
candModeList[1]=RefLineIdx==0?DC: 34
candModeList[2]=Vertical
candModeList[3]=Horizontal
candModeList[4]=Vertical−K
candModeList[5]=Vertical+K In another example, the default modes for zero and non-zero reference lines may be formulated as follows, wherein candIntraPredModeA is equal to Planar or DC mode:

candModeList[0]
=RefLineIdx==0?candIntraPredModeA: 2
candModeList[1]=RefLineIdx==0?(1−candIntraPredModeA): 34
candModeList[2]=Vertical
candModeList[3]=Horizontal
candModeList[4]=Vertical−K
candModeList[5]=Vertical+K In an embodiment, if one neighboring mode is Planar or DC mode, or any non-angular mode, and the other neighboring mode is angular mode, then Planar or DC mode may be always firstly inserted into the MPM list with index 0 and the angular neighboring mode may be always secondly inserted into the MPM list with index 1.

In one embodiment, if a zero-reference line index is signaled, Planar mode may be always firstly inserted into the MPM list with index 0, angular neighboring mode may be always secondly inserted into the MPM list with index 1, and DC mode may be always thirdly inserted into the MPM list with index 2. One example is shown below:

candModeList[0]=Planar
candModeList[1]=max (candIntraPredModeA, candIntraPredModeB)
candModeList[2]=DC
candModeList[3]=2+((mpm[1]+offset) % mod)
candModeList[4]=2+((mpm[1]−1) % mod)
candModeList[5]=2+((mpm[1]+offset−1) % mod)

In another embodiment, if a zero reference index is signaled, non-angular neighboring mode may be always firstly inserted into the MPM list with index 0, angular neighboring mode may be always secondly inserted into the MPM list with index 1, and the MPM candidate with index 2 may be always set equal to (1−candModeList[0]). One example is shown below:

candModeList[0]=min(candIntraPredModeA, candIntraPredModeB)
candModeList[1]=max(candIntraPredModeA, candIntraPredModeB)
candModeList[2]=1−candModeList[0]
candModeList[3]=2+((mpm[1]+offset) % mod)
candModeList[4]=2+((mpm[1]−1) % mod)
candModeList[5]=2+((mpm[1]+offset−1) % mod)

In another embodiment, if a zero reference line index is signaled, angular neighboring mode may be always firstly inserted into the MPM list with index 0, non-angular neighboring mode may be always secondly inserted into the MPM list with index 1, and the MPM candidate with index 2 may be always set equal to (1−candModeList[1]). One example is shown below:

candModeList[0]=max(candIntraPredModeA, candIntraPredModeB)
candModeList[1]=min(candIntraPredModeA, candIntraPredModeB)
candModeList[2]=1−candModeList[1]
candModeList[3]=2+((mpm[0]+offset) % mod)
candModeList[4]=2+((mpm[0]−1) % mod)
candModeList[5]=2+((mpm[0]+offset−1) % mod)

Another example is shown below:

candModeList[0]=max (candIntraPredModeA, candIntraPredModeB)
candModeList[1]=Planar
candModeList[2]=DC
candModeList[3]=2+((mpm[0]+offset) % mod)
candModeList[4]=2+((mpm[0]−1) % mod)
candModeList[5]=2+((mpm[0]+offset−1) % mod)

In an embodiment, for a zero-reference line, if one neighboring block is associated with a non-angular mode, for example, Planar mode, DC mode, inter mode, intra-inter mode, or CPR mode, and the other neighboring mode is angular mode, then whether the Planar or DC mode is placed before angular neighboring mode in the MPM list or not is dependent on the mode number of angular neighboring mode.

In an embodiment, if the angular neighboring mode is a vertical mode, or a horizontal mode, the angular neighboring mode is firstly inserted into the MPM list with index 0, Planar or DC mode is secondly inserted into the MPM list with index 1. Otherwise, Planar or DC mode is firstly inserted into the MPM list with index 0, angular neighboring mode is secondly inserted into the MPM list with index 1. An example is shown below:

candModeList[0]=
(maxAB==INTRA_ANGULAR50||maxAB==INTRA_ANGULAR18)?maxAB: minAB
candModeList[1]=
(maxAB==INTRA_ANGULAR50||maxAB==INTRA_ANGULAR18)?minAB: maxAB
candModeList[2]=1−minAB
candModeList[3]=2+((maxAB+offset) % mod)
candModeList[4]=2+((maxAB−1) % mod)
candModeList[5]=2+((maxAB+offset−1) % mod)

In an embodiment, if the angular neighboring mode is the vertical mode, or the horizontal mode, or a diagonal mod, for example mode 2, 34, 66, the angular neighboring mode is firstly inserted into the MPM list with index 0, and the Planar or DC mode is secondly inserted into the MPM list with index 1. Otherwise, Planar or DC mode is firstly inserted into the MPM list with index 0, and angular neighboring mode is secondly inserted into the MPM list with index 1.

In an embodiment, if the angular neighboring mode is the vertical mode, or the horizontal mode, the angular neighboring mode is firstly inserted into the MPM list with index 0, Planar or DC mode is secondly inserted into the MPM list with index 1. Otherwise, a left neighboring mode of a block neighboring a current block to the left is firstly inserted into the MPM list with index 0, and an above neighboring mode of a block above a current block is secondly inserted into the MPM list with index 1. An example is shown below:

candModeList[0]=
        (maxAB==INTRA_ANGULAR50||maxAB==INTRA_ANGULAR18)?maxAB: candIntraPredModeA
    candModeList[1]=
        (maxAB==INTRA_ANGULAR50||maxAB==INTRA_ANGULAR18)?minAB: candIntraPredModeB
    candModeList[2]=1−minAB
    candModeList[3]=2+((maxAB+offset) % mod)
    candModeList[4]=2+((maxAB−1) % mod)
    candModeList[5]=2+((maxAB+offset−1) % mod)

In an embodiment, if the angular neighboring mode is the vertical mode, or the horizontal mode, or a diagonal mode, for example mode 2, 34, 66, the angular neighboring mode is firstly inserted into the MPM list with index 0, and the Planar or DC mode is secondly inserted into the MPM list with index 1. Otherwise, left neighboring mode is firstly inserted into the MPM list with index 0, and above neighboring mode is secondly inserted into the MPM list with index 1.

In an embodiment, if the angular neighboring mode is a mode that does not generate prediction samples at fractional position using interpolation, such as, for example mode 2, 34, 66, Horizontal, Vertical, 72, 76, 78, 80, −6, −10, −12, −14, the angular neighboring mode is firstly inserted into the MPM list with index 0, and the Planar or DC mode is secondly inserted into the MPM list with index 1. Otherwise, Planar or DC mode is firstly inserted into the MPM list with index 0, and the angular neighboring mode is secondly inserted into the MPM list with index 1.

In an embodiment, a determination of whether Planar or DC mode is placed before the angular neighboring mode in the MPM list also depends on the position of the neighboring angular mode, for example whether it comes from the left neighboring block or above neighboring block.

In an embodiment, if the left angular neighboring mode is the horizontal mode or the above angular neighboring mode is the vertical mode, then angular neighboring mode is firstly inserted into the MPM list with index 0, Planar or DC mode is secondly inserted into the MPM list with index 1. Otherwise, Planar or DC mode is firstly inserted into the MPM list with index 0, and the angular neighboring mode is secondly inserted into the MPM list with index 1.

In an embodiment, if the left angular neighboring mode is horizontal-like mode and it does not generate prediction samples at fractional position using interpolation, for example mode 2, Horizontal, −6, −10, −12, −14, then angular neighboring mode is firstly inserted into the MPM list with index 0, Planar or DC mode is secondly inserted into the MPM list with index 1. Otherwise, Planar or DC mode is firstly inserted into the MPM list with index 0, and the angular neighboring mode is secondly inserted into the MPM list with index 1.

In an embodiment, if the above angular neighboring mode is vertical-like mode and it does not generate prediction samples at fractional position using interpolation, for example mode 66, Vertical, 72, 76, 78, 80, then angular neighboring mode is firstly inserted into the MPM list with index 0, Planar or DC mode is secondly inserted into the MPM list with index 1. Otherwise, Planar or DC mode is firstly inserted into the MPM list with index 0, and the angular neighboring mode is secondly inserted into the MPM list with index 1.

Figure 9:
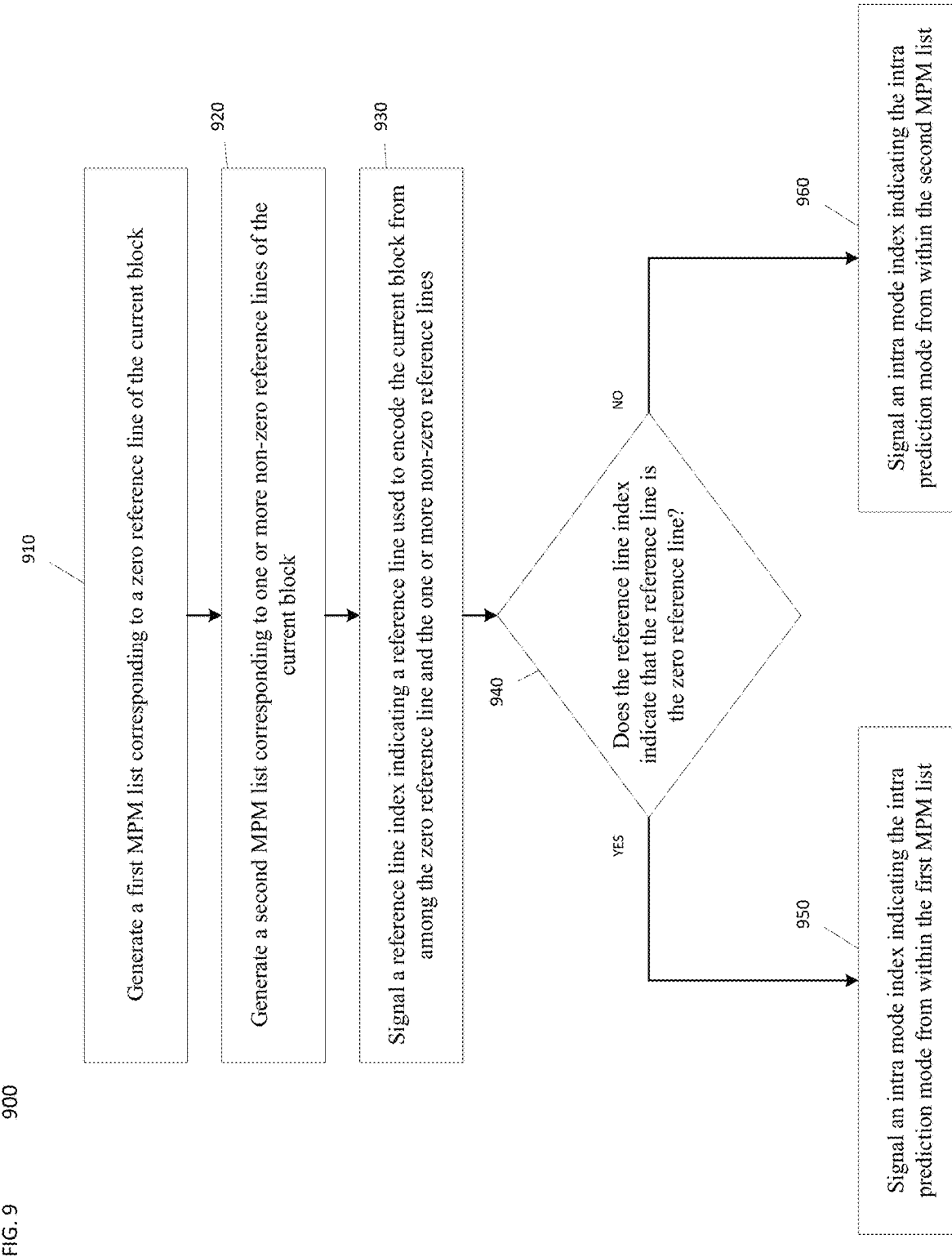
FIG. 9 is a flowchart of an example process for signaling an intra prediction mode used to encode a current block in an encoded video bitstream according to an embodiment.

FIG. 9 is a flowchart of an example process 900 for signaling an intra prediction mode used to encode a current block in an encoded video bitstream. In some implementations, one or more process blocks of FIG. 9 may be performed by decoder 610. In some implementations, one or more process blocks of FIG. 9 may be performed by another device or a group of devices separate from or including decoder 610, such as encoder 603.

As shown in FIG. 9, process 900 may include generating a first most probable mode (MPM) list corresponding to a zero reference line of the current block (block 910). The first MPM list may include a plurality of angular intra prediction modes.

As further shown in FIG. 9, process 900 may include generating a second MPM list corresponding to one or more non-zero reference lines of the current block (block 920). The second MPM list may include the same plurality of angular intra prediction modes.

As further shown in FIG. 9, process 900 may include signalling a reference line index indicating a reference line used to encode the current block from among the zero reference line and the one or more non-zero reference lines (block 930).

As further shown in FIG. 9, process 900 may include determining whether the reference line index indicates that the reference line is the zero reference line (block 940). Based on the reference line index indicating that the reference line is the zero reference line, process 900 may then signal the intra mode index indicating the intra prediction mode from within the first MPM list (block 950). Based on the reference line index indicating that the reference line is one from among the one or more non-zero reference lines, process 900 may then signal the intra mode index indicating the intra prediction mode from within the second MPM list (block 950).

In an embodiment, the first MPM list further includes one or more non-angular intra prediction modes, and the second MPM list does not include the one or more non-angular intra prediction modes.

In an embodiment, the one or more non-angular intra prediction modes include at least one from among a planar mode and a DC mode.

In an embodiment, the first MPM list includes a first plurality of indexes corresponding to the plurality of angular intra prediction modes, the second MPM list includes a second plurality of indexes corresponding to the plurality of angular intra prediction modes, and the first plurality of indexes is same as the second plurality of indexes.

In an embodiment, the plurality of angular intra prediction modes includes a first angular intra prediction mode and a second angular intra prediction mode, the first angular intra prediction mode corresponds to a first index of the first plurality of indexes, the second angular intra prediction mode corresponds to a second index of the first plurality of indexes, the first angular intra prediction mode corresponds to a first index of the second plurality of indexes, the second angular intra prediction mode corresponds to a second index of the second plurality of indexes, the first index of the first plurality of indexes is same as the first index of the second plurality of indexes, and the second index of the first plurality of indexes is same as the second index of the second plurality of indexes.

In an embodiment, based on a first neighboring mode of a first neighboring block of the current block being a non-angular mode, and based on a second neighboring mode of a second neighboring block of the current block being an angular mode, a first intra prediction mode of the first MPM list may be the non-angular mode, and a second intra prediction mode of the first MPM list may be the angular mode.

In an embodiment, based on the first neighboring mode being a DC mode, and based on the reference line index indicating the reference line is the zero reference line, the first intra prediction mode of the first MPM list may be the DC mode.

In an embodiment, based on the first neighboring mode being a planar mode, and based on the reference line index indicating the reference line is the zero reference line, the first intra prediction mode of the first MPM list may be the planar mode.

In an embodiment, based on the reference line index indicating the reference line is the zero reference line, the first intra prediction mode of the first MPM list may be a planar mode, the second intra prediction mode of the first MPM list may be the angular mode, and a third intra prediction mode of the first MPM list may be a DC mode.

In an embodiment, based on the reference line index indicating the reference line is the zero reference line, and based on a first neighboring mode of a first neighboring block of the current block being a non-angular mode, and based on a second neighboring mode of a second neighboring block of the current block being an angular mode, a first intra prediction mode of the first MPM list may be the angular mode, and a second intra prediction mode of the first MPM list may be the non-angular mode. Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 10 shows a computer system 1200 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 10 for computer system 1200 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 1200.

Computer system 1200 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1001, mouse 1002, trackpad 1003, touch screen 1010, data-glove 1204, joystick 1005, microphone 1006, scanner 1007, camera 1008.

Computer system 1200 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1010, data-glove 1204, or joystick 1005, but there can also be tactile feedback devices that do not serve as input devices), audio output devices (such as: speakers 1009, headphones (not depicted)), visual output devices (such as screens 1010 to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 1200 can also include human accessible storage devices and their associated media such as optical media including CD/DVD ROM/RW 1020 with CD/DVD or the like media 1021, thumb-drive 1022, removable hard drive or solid state drive 1023, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1200 can also include interface(s) to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1049) (such as, for example universal serial bus (USB) ports of the computer system 1200; others are commonly integrated into the core of the computer system 1200 by attachment to a system bus as described below (for example Ethernet interface into a PC computer system or cellular network interface into a smartphone computer system). Using any of these networks, computer system 1200 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core 1040 of the computer system 1200.

The core 1040 can include one or more Central Processing Units (CPU) 1041, Graphics Processing Units (GPU) 1042, specialized programmable processing units in the form of Field Programmable Gate Areas (FPGA) 1043, hardware accelerators for certain tasks 1044, and so forth. These devices, along with Read-only memory (ROM) 1045, Random-access memory (RAM) 1046, internal mass storage such as internal non-user accessible hard drives, solid-state drives (SSDs), and the like 1047, may be connected through a system bus 1248. In some computer systems, the system bus 1248 can be accessible in the form of one or more physical plugs to enable extensions by additional CPUs, GPU, and the like. The peripheral devices can be attached either directly to the core's system bus 1248, or through a peripheral bus 1049. Architectures for a peripheral bus include peripheral component interconnect (PCI), USB, and the like.

CPUs 1041, GPUs 1042, FPGAs 1043, and accelerators 1044 can execute certain instructions that, in combination, can make up the aforementioned computer code. That computer code can be stored in ROM 1045 or RAM 1046. Transitional data can be also stored in RAM 1046, whereas permanent data can be stored for example, in the internal mass storage 1047. Fast storage and retrieve to any of the memory devices can be enabled through the use of cache memory, that can be closely associated with one or more CPU 1041, GPU 1042, mass storage 1047, ROM 1045, RAM 1046, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1200, and specifically the core 1040 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 1040 that are of non-transitory nature, such as core-internal mass storage 1047 or ROM 1045. The software implementing various embodiments of the present disclosure can be stored in such devices and executed by core 1040. A computer-readable medium can include one or more memory devices or chips, according to particular needs. The software can cause the core 1040 and specifically the processors therein (including CPU, GPU, FPGA, and the like) to execute particular processes or particular parts of particular processes described herein, including defining data structures stored in RAM 1046 and modifying such data structures according to the processes defined by the software. In addition or as an alternative, the computer system can provide functionality as a result of logic hardwired or otherwise embodied in a circuit (for example: accelerator 1044), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The invention claimed is:

1. A method of video encoding using at least one processor, the method comprising:
    generating a first most probable mode (MPM) list corresponding to a zero reference line of a current block and a second MPM list corresponding to one or more non-zero reference lines of the current block, each of the first MPM list and the second MPM list comprising a plurality of angular intra prediction modes;
    signaling a reference line index indicating a reference line among the zero reference line and the one or more non-zero reference lines; and
    signaling an intra mode index indicating an intra prediction mode in the first MPM list or the second MPM list, wherein
    the first MPM list includes a first plurality of indexes corresponding to the plurality of angular intra prediction modes,
    the second MPM list includes a second plurality of indexes corresponding to the plurality of angular intra prediction modes,
    the first plurality of indexes is same as the second plurality of indexes,
    the first MPM list further comprises one or more non-angular intra prediction modes, and
    the second MPM list does not include the one or more non-angular intra prediction modes.

2. The method of claim 1, wherein the one or more non-angular intra prediction modes comprise at least one of a planar mode and a DC mode.

3. The method of claim 1, wherein
    the plurality of angular intra prediction modes includes a first angular intra prediction mode and a second angular intra prediction mode,
    the first angular intra prediction mode corresponds to a first index of the first plurality of indexes,
    the second angular intra prediction mode corresponds to a second index of the first plurality of indexes,
    the first angular intra prediction mode corresponds to a first index of the second plurality of indexes,
    the second angular intra prediction mode corresponds to a second index of the second plurality of indexes, the first index of the first plurality of indexes is same as the first index of the second plurality of indexes, and
the second index of the first plurality of indexes is same as the second index of the second plurality of indexes.

4. The method of claim 1, wherein when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and
wherein when the angular mode is a mode other than the horizontal mode and the vertical mode, the first intra prediction mode of the first MPM list is the at least one of the planar mode and the DC mode, and the second intra prediction mode of the first MPM list is the angular mode.

5. The method of claim 1, wherein when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and
wherein when the angular mode is a mode other than the horizontal mode and the vertical mode, the first intra prediction mode of the first MPM list is a left neighboring mode of a left neighboring block of the current block, and the second intra prediction mode of the first MPM list is an above neighboring mode of an above neighboring block of the current block.

6. The method of claim 1, wherein when a neighboring block of the current block is coded with an angular mode that is a mode which does not generate prediction samples at fractional position using interpolation, a first intra prediction mode of the first MPM list is the angular mode, and a second intra prediction mode of the first MPM list is the at least one of a planar mode and a DC mode, and
wherein when the angular mode is a mode which generates the prediction samples at the fractional position using the interpolation, the first intra prediction mode of the first MPM list is the at least one of the planar mode and the DC mode, and the second intra prediction mode of the first MPM list is the angular mode.

7. A method of video decoding using at least one processor, the method comprising:
receiving a reference line index indicating a reference line among a zero reference line of a current block and one or more non-zero reference lines of the current block, the zero reference line corresponding to a first most probable mode (MPM) list, the one or more non-zero reference lines corresponding to a second MPM list;
receiving an intra mode index indicating an intra prediction mode in the first MPM list or the second MPM list; and
generating the first MPM list and the second MPM list, each of the first MPM list and the second MPM list comprising a plurality of angular intra prediction modes, wherein the first MPM list includes a first plurality of indexes corresponding to the plurality of angular intra prediction modes,
the second MPM list includes a second plurality of indexes corresponding to the plurality of angular intra prediction modes,
the first plurality of indexes is same as the second plurality of indexes,
the first MPM list further comprises one or more non-angular intra prediction modes, and
the second MPM list does not include the one or more non-angular intra prediction modes.

8. The method of claim 7, wherein the one or more non-angular intra prediction modes comprise at least one of a planar mode and a DC mode.

9. The method of claim 7, wherein
the plurality of angular intra prediction modes includes a first angular intra prediction mode and a second angular intra prediction mode,
the first angular intra prediction mode corresponds to a first index of the first plurality of indexes,
the second angular intra prediction mode corresponds to a second index of the first plurality of indexes,
the first angular intra prediction mode corresponds to a first index of the second plurality of indexes,
the second angular intra prediction mode corresponds to a second index of the second plurality of indexes,
the first index of the first plurality of indexes is same as the first index of the second plurality of indexes, and
the second index of the first plurality of indexes is same as the second index of the second plurality of indexes.

10. The method of claim 7, wherein
when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and
when the angular mode is a mode other than the horizontal mode and the vertical mode, the first intra prediction mode of the first MPM list is the at least one of the planar mode and the DC mode, and the second intra prediction mode of the first MPM list is the angular mode.

11. The method of claim 7, wherein
when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and
when the angular mode is a mode other than the horizontal mode and the vertical mode, the first intra prediction mode of the first MPM list is a left neighboring mode of a left neighboring block of the current block, and the second intra prediction mode of the first MPM list is an above neighboring mode of an above neighboring block of the current block.

12. The method of claim 7, wherein
when a neighboring block of the current block is coded with an angular mode that is a mode which does not generate prediction samples at fractional position using interpolation, a first intra prediction mode of the first MPM list is the angular mode, and a second intra prediction mode of the first MPM list is the at least one of a planar mode and a DC mode, and
when the angular mode is a mode which generates the prediction samples at the fractional position using the interpolation, the first intra prediction mode of the first MPM list is the at least one of the planar mode and the DC mode, and the second intra prediction mode of the first MPM list is the angular mode.

13. A method of processing visual media data, the method comprising:
processing a bitstream of the visual media data according to a format rule, wherein the bitstream includes a reference line index and an intra mode index, the reference line index indicating a reference line among a zero reference line of a current block and one or more non-zero reference lines of the current block, the zero reference line corresponding to a first most probable mode (MPM) list, the one or more non-zero reference lines corresponding to a second MPM list, the intra mode index indicating an intra prediction mode in the first MPM list or the second MPM list; and the format rule specifies that the first MPM list and the second MPM list comprise a plurality of angular intra prediction modes, the first MPM list includes a first plurality of indexes corresponding to the plurality of angular intra prediction modes, the second MPM list includes a second plurality of indexes corresponding to the plurality of angular intra prediction modes, the first plurality of indexes is same as the second plurality of indexes, the first MPM list further comprises one or more non-angular intra prediction modes, and the second MPM list does not include the one or more non-angular intra prediction modes.

14. The method of claim 13, wherein the format rule specifies that the one or more non-angular intra prediction modes comprise at least one of a planar mode and a DC mode.

15. The method of claim 13, wherein the format rule specifies that the plurality of angular intra prediction modes includes a first angular intra prediction mode and a second angular intra prediction mode, the first angular intra prediction mode corresponds to a first index of the first plurality of indexes, the second angular intra prediction mode corresponds to a second index of the first plurality of indexes, the first angular intra prediction mode corresponds to a first index of the second plurality of indexes, the second angular intra prediction mode corresponds to a second index of the second plurality of indexes, the first index of the first plurality of indexes is same as the first index of the second plurality of indexes, and the second index of the first plurality of indexes is same as the second index of the second plurality of indexes.

16. The method of claim 13, wherein the format rule specifies that when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and when the angular mode is a mode other than the horizontal mode and the vertical mode, the first intra prediction mode of the first MPM list is the at least one of the planar mode and the DC mode, and the second intra prediction mode of the first MPM list is the angular mode.

17. The method of claim 13, wherein the format rule specifies that when a neighboring block of the current block is coded with an angular mode that is one of a horizontal mode and a vertical mode, a first intra prediction mode of the first MPM list is the angular mode, and a second intra prediction mode of the first MPM list is the at least one of a planar mode and a DC mode, and when the angular mode is a mode other than the horizontal mode and the vertical mode, the first intra prediction mode of the first MPM list is a left neighboring mode of a left neighboring block of the current block, and the second intra prediction mode of the first MPM list is an above neighboring mode of an above neighboring block of the current block.

18. The method of claim 13, wherein the format rule specifies that when a neighboring block of the current block is coded with an angular mode that is a mode which does not generate prediction samples at fractional position using interpolation, a first intra prediction mode of the first MPM list is the angular mode, and a second intra prediction mode of the first MPM list is the at least one of a planar mode and a DC mode, and when the angular mode is a mode which generates the prediction samples at the fractional position using the interpolation, the first intra prediction mode of the first MPM list is the at least one of the planar mode and the DC mode, and the second intra prediction mode of the first MPM list is the angular mode.

* * * * *